Oct. 30, 1923.

C. A. PLEMPEL 1,472,229

CONFECTION MOLD

Filed March 6, 1922

INVENTOR
Charles A. Plempel,
Byrnes, Stebbins, Burgess & Parmelee
his attys

Patented Oct. 30, 1923.

1,472,229

UNITED STATES PATENT OFFICE.

CHARLES A. PLEMPEL, OF PITTSBURGH, PENNSYLVANIA.

CONFECTION MOLD.

Application filed March 6, 1922. Serial No. 541,528.

*To all whom it may concern:*

Be it known that I, CHARLES A. PLEMPEL, a citizen of the United States, residing at Pittsburgh, in the county of Allegheny and State of Pennsylvania, have invented a new and useful Improvement in Confection Molds, of which the following is a full, clear, and exact description.

The present invention relates broadly to confection making, and more particularly to a mold especially adapted for making chocolate coated confections.

In the art to which the present invention relates there are certain features which must be given careful consideration. Among these are sanitation, uniformity of product, ease of separation of the product from the mold and economy due to a minimization of the breakage. The present invention is designed with reference to all of these features.

It has heretofore been proposed to make chocolate coated confections by the use of a mold comprising separable members adapted to cooperate to produce chocolate shells of substantially uniform thickness, which shells are later filled with any desired material and sealed with material having a composition generally similar to the composition of the shell. Such molds have overcome the objections raised to chocolate coated confections generally, but the use of the molds has been attended with considerable difficulty due to the tendency of the chocolate to spread out between surfaces of adjoining parts of the mold, and also the difficulty of removing the finished shells or confections. This has resulted in undue breakage. By the present invention these objections and difficulties are overcome.

In the accompanying drawings there is illustrated a preferred embodiment of my invention, but it will be understood that changes may be made in the shape, construction and operation of the parts without departing from the spirit of the invention or scope of my broader claims.

Figure 1:
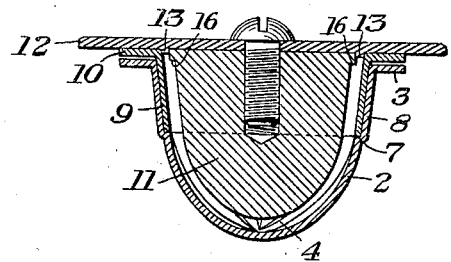
Figure 1 is a vertical sectional view through a mold constructed in accordance with the present invention.
Figure 2:
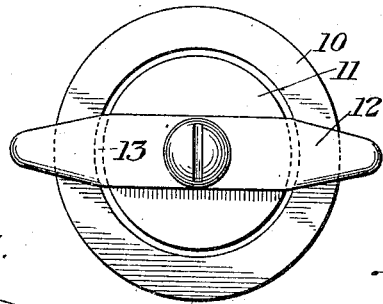
Figure 2 is a top plan view of the construction illustrated in Figure 1.
Figure 3:
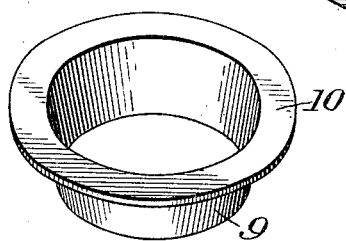
Figure 3 is a perspective view of the removable ring.
Figure 4:
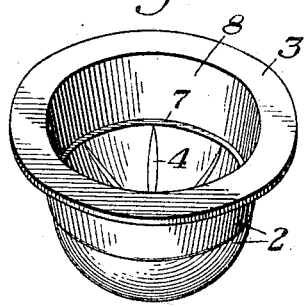
Figure 4 is a perspective view of the receptacle.
Figure 5:
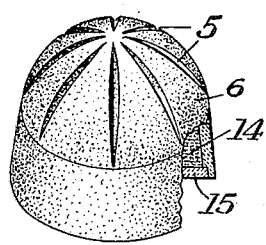
Figure 5 is a perspective view, partly broken away, illustrating a finished confection.

Referring more particularly to the drawings, my improved mold comprises a receptacle 2 preferably having a smooth interior gradually increasing in diameter toward the flange 3. If desired, the receptacle may have formed thereon suitable depressions or ridges 4 for imparting a corresponding characteristic design 5 to the finished shell 6 of the confection.

At an intermediate portion of the receptacle, it is provided with an offset 7 to provide an offset portion 8 adapted to slidingly and accurately receive a removable ring 9. The ring 9 is preferably provided with an outer wall shaped to fit the offset portion 8 and with an inner inclined wall adapted to lie substantially flush with and constitute a continuation of the inner surface of the receptacle 2. The ring 9 may be provided with a flange 10 to facilitate insertion and removal of the ring. Cooperating with the receptacle and ring is a core 11 secured in any desired manner to a bar 12 facilitating operation of the core and provided with shoulders 13 for accurately centering the core with respect to the receptacle.

In operation, the ring 9 is inserted in position in the receptacle and the desired amount of melted chocolate poured into the receptacle. The core is then inserted to cause the chocolate to flow upwardly therearound to form a shell 6 of uniform thickness. In case an excess of melted chocolate is supplied, the insertion of the core will cause the same to flow upwardly beyond the flange 10. Rotation of the bar 12 will shear away such excess and provide a smooth edge. The core may then be withdrawn and the shell 6 supplied with any desired filling 14. Thereafter a closure disc 15 may be sealed in position, or melted chocolate may be added to accomplish such sealing.

In order to provide a shoulder for receiving the disc 15, the core 11 may be formed with a circumferentially extending projecting portion 16 adapted to limit the thickness of the shell adjacent thereto.

The finished confection, or the finished shell, may be easily removed from the receptacle 2 by withdrawing the ring 9 which, due to its inclined sides, withdraws the confection or shell therewith, and then resting the bottom of the confection or shell on a suitable supporting surface and pressing the ring downwardly to release it therefrom.

By a construction such as described herein, in which the ring extends downwardly into an offset portion in the receptacle, plastic material is prevented from flowing upwardly between the ring and the receptacle and at the same time the ring provides means by which the confection may be easily removed. The core cooperates therewith in a sanitary manner to produce shells of uniform thickness and enables any surplus material to be easily removed. All of these constitute important advantages of the present invention.

I claim:

1. In a mold for confections, a receptacle having an offset portion, a ring telescopically engaging said offset portion and adapted to be withdrawn to remove a molded confection, and a core adapted to cooperate with said receptacle and ring, substantially as described.

2. In a mold for confections, a receptacle having an offset portion, a ring telescopically engaging said offset portion, and a core adapted to cooperate with said receptacle and ring, said core having an operating means by which surplus material may be easily removed from the molded article, substantially as described.

3. In a mold for confections, a receptacle having an offset portion, a ring telescopically engaging said offset portion and adapted to be withdrawn to remove a molded confection, and a core adapted to cooperate with said receptacle and ring, said core having means cooperating with the ring for centering the same therein, substantially as described.

4. In a mold for confections, a receptacle having an offset portion, a ring telescopically engaging said offset portion, and a core adapted to cooperate with said receptacle and ring, said core having secured thereto a cross-bar adapted to cooperate with the ring to facilitate insertion and removal of the core and to effect removal of surplus material from the confection being molded, substantially as described.

5. In a mold for confections, a receptacle having an annular offset portion, a ring movable axially of said receptacle and adapted to detachably engage said offset portion, said ring having an inclined inner wall adapted to lie substantially flush with the wall of the receptacle and constitute a continuation thereof, and a core adapted to cooperate with said receptacle and ring, substantially as described.

6. In a mold for confections, a receptacle having an annular offset portion, a unitary ring adapted to cooperate with said portion and having means to facilitate removal thereof from the receptacle to remove a molded article, and a core adapted to cooperate with said receptacle and ring, substantially as described.

7. In a mold for confections, a receptacle having an annular offset portion, a ring adapted to cooperate with said portion and having means to facilitate removal thereof from the receptacle, and a core adapted to cooperate with said receptacle and ring, said core having means cooperating with said ring for centering the same therein, substantially as described.

In testimony whereof I have hereunto set my hand.

CHARLES A. PLEMPEL.